(12) United States Patent
Kim et al.

(10) Patent No.: US 7,163,767 B2
(45) Date of Patent: Jan. 16, 2007

(54) ORGANIC ELECTROLYTIC SOLUTION AND LITHIUM BATTERY EMPLOYING THE SAME

(75) Inventors: Ju-yup Kim, Seoul (KR); Young-gyoon Ryu, Kyungki-do (KR); Seok-soo Lee, Kyungki-do (KR); Seung-sik Hwang, Kyungki-do (KR)

(73) Assignee: Samsung SDI Co., Ltd., Suwon (KR)

( * ) Notice: Subject to any disclaimer, the term of this patent is extended or adjusted under 35 U.S.C. 154(b) by 460 days.

(21) Appl. No.: 10/449,775

(22) Filed: Jun. 2, 2003

(65) Prior Publication Data

US 2004/0067418 A1    Apr. 8, 2004

(30) Foreign Application Priority Data

Oct. 4, 2002    (KR) ............... 10-2002-0060530

(51) Int. Cl.
*H01M 6/18* (2006.01)
*H01M 6/16* (2006.01)
*H01M 4/58* (2006.01)

(52) U.S. Cl. ............... 429/306; 429/324; 429/231.95
(58) Field of Classification Search ............. 429/306, 429/324, 231.95
See application file for complete search history.

(56) References Cited

U.S. PATENT DOCUMENTS

| | | | |
|---|---|---|---|
| 5,037,713 A | 8/1991 | Yoshino et al. | |
| 5,272,022 A | 12/1993 | Takami et al. | |
| 5,541,020 A | 7/1996 | Golovin et al. | |
| 5,961,672 A | 10/1999 | Skotheim et al. | |
| 6,017,651 A | 1/2000 | Nimon et al. | |
| 6,025,094 A | 2/2000 | Visco et al. | |
| 6,030,720 A | 2/2000 | Chu et al. | |
| 6,132,906 A | 10/2000 | Nishimura et al. | |
| 6,225,002 B1 | 5/2001 | Nimon et al. | |
| 6,436,583 B1 | 8/2002 | Mikhaylik | |
| 6,534,613 B1* | 3/2003 | Ford et al. | 526/352 |

FOREIGN PATENT DOCUMENTS

EP    0 924 789 A1    6/1999

(Continued)

OTHER PUBLICATIONS

Notice to Submit Response issued by the Korean Industrial Property Office on May 25, 2004 in corresponding Application No. 10-2002-0060530.

(Continued)

*Primary Examiner*—Dah-Wei Yuan
(74) *Attorney, Agent, or Firm*—Buchanan Ingersoll & Rooney PC

(57) ABSTRACT

Provided is an organic electrolytic solution including a lithium salt and an organic solvent containing an alkoxy-containing compound such as 1,1,3-trimethoxypropane. When polyglyme and an organic compound having dioxolane moiety are further added into the organic electrolytic solution, a lithium metal stabilizing effect and the ionic conductivity of lithium ions are enhanced, and thus, the charging/discharging efficiency of lithium is greatly improved. Such an organic electrolytic solution can be effectively used for any kind of lithium batteries and lithium sulfur batteries, even whose which use a lithium metal anode.

10 Claims, 2 Drawing Sheets

FOREIGN PATENT DOCUMENTS

| | | |
|---|---|---|
| EP | 0924789 A1 | 6/1999 |
| JP | 10-012275 | 1/1998 |
| JP | 11-026015 | 1/1999 |
| JP | 2002-110237 | 4/2002 |
| WO | 99/19917 A2 | 4/1999 |
| WO | WO 99/19917 | 4/1999 |
| WO | WO 00/36683 * | 6/2000 |

OTHER PUBLICATIONS

*Office Action, European Patent Office, dated Feb. 14, 2005.
*Chinese Office Action.

* cited by examiner

ORGANIC ELECTROLYTIC SOLUTION AND LITHIUM BATTERY EMPLOYING THE SAME

This application claims priority from Korean Patent Application No. 2002-60530, filed on Oct. 4, 2002, in the Korean Intellectual Property Office, the disclosure of which is incorporated herein in its entirety by reference.

BACKGROUND OF THE INVENTION

1. Field of the Invention

The present invention relates to an organic electrolytic solution and a lithium battery employing the same, and more particularly, to an organic electrolytic solution providing a lithium metal stabilizing effect and improving the conductivity of lithium ions, and a lithium battery employing the same.

2. Description of the Related Art

With the rapid advance of compact portable electronic devices, there is an increasing need for batteries having high energy densities for miniature portable electronic devices.

Lithium sulfur batteries are known as the most promising types of batteries that capable of satisfying the above requirement over other batteries developed by far due to their high energy density. Lithium and sulfur ($S_8$) used as active materials in the manufacture of lithium sulfur batteries have an energy density of about 3,830 mAh/g and 1,675 mAh/g, respectively, and are known as being economical and environmentally friendly. However, there has been no successful commercial use of these active materials in battery systems. The reason why it has been difficult to commercialize lithium sulfur batteries lies in the low availability of sulfur as an active material in electrochemical oxidation reactions, which finally leads to low battery capacitance. In addition, the lifespan of batteries can be shortened due to the outflow of sulfur to electrolyte during oxidation and reduction reactions. If an unsuitable electrolyte is used, sulfur is reduced and separated as lithium sulfide ($Li_2S$) that is no longer available in electrochemical reactions.

To resolve these problems, many attempts have been made to optimize the composition of the electrolyte. As an example, U.S. Pat. No. 6,030,720 discloses use of a mixture of a main solvent such as tetraglyme and a donor solvent having 15 or greater donor number, such as n,n-diethylacetylamide, as an organic solvent of an organic electrolyte.

U.S. Pat. No. 5,961,672 discloses use of an organic electrolytic solution of 1 M $LiSO_3CF_3$ in a mixed solvent of 1,3-dioxolane, diglyme, sulfolane, and diethoxyethane for improved lifespan and safety measures, wherein a lithium metal anode is coated with a polymeric film.

When a lithium metal electrode is used as an anode of a lithium secondary battery, the lifespan, capacitance, and other properties of the battery degrade compared with a case using a carbonaceous or graphite electrode. In particular, as a result of repeated charging/discharging cycles, dendrites are separated and grow on the surface of the lithium metal anode, and contact the surface of a cathode, thereby causing shorting out. In addition, the lithium metal corrodes as a result of a reaction with an electrolytic solution at the surface of the lithium anode.

As a solution to these problems, a method of forming a protecting layer on the surface of the lithium metal electrode has been suggested (U.S. Pat. Nos. 6,017,651, 6,025,094, and 5,961,672). To be effective, the protecting layer formed on the surface of the lithium electrode should allow lithium ions to pass through itself as well as act as a barrier to prevent an electrolytic solution from contacting the lithium metal of the anode.

In general, this lithium-protecting layer is formed by the reaction between lithium and a protective layer-forming additive contained in the electrolytic solution after the assembly of the battery. However, the protecting layer formed by this method has poor density, so that a considerable amount of electrolytic solution permeates through cracks present in the protective layer and undesirably react with lithium metal.

Another method for forming the lithium-protecting layer involves processing the surface of the lithium electrode with nitrogen plasma to form a lithium nitride ($Li_3N$) layer on the electrode. However, the lithium nitride layer formed by this method includes grain boundaries through which the electrolytic solution easily permeates, is highly likely to decompose when in contact with water, and has a low potential window. Therefore, the lithium nitride layer is impractical to use.

U.S. Pat. No. 5,272,022 discloses a non-aqueous electrolyte secondary battery employing an anode formed of a carbonaceous active material, in which a mixture of a non-aqueous solvent selected from the group consisting of an acyclic carbonate material, a cyclic carbonate material, γ-butyrolactone, and acetonirile, and a second non-aqueous solvent, such as 1,2-diethoxyethane and 1,2-dimethoxyethane are used for an electrolytic solution.

The non-aqueous electrolyte secondary battery provides enhanced cycling properties when used together with an anode containing a carbonaceous material. However, the non-aqueous electrolyte secondary battery still needs improvements, in terms of electrode stability, when used with a lithium metal electrode.

SUMMARY OF THE INVENTION

The present invention provides an organic electrolytic solution capable of improving the charging/discharging efficiency of lithium when used together with a lithium metal electrode, by suppressing the reactivity of lithium and improving the ionic conductivity of lithium ions.

The present invention provides a lithium battery providing improved charging/discharging efficiency by using the organic electrolytic solution.

The present invention provides a lithium sulfur battery providing improved charging/discharging efficiency by using the organic electrolytic solution.

In accordance with one aspect of the present invention, there is provided n organic electrolytic solution comprising a lithium salt and an organic solvent containing an alkoxy-containing compound of formula (1) below:

$$CH_3O(CH_2)_nCHR^1R^2 \qquad (1)$$

where n is an integer from 1 to 5; and $R^1$ and $R^2$ are independently selected from the group consisting of halogen atoms, a hydroxy group, a substituted or unsubstituted $C_1$–$C_{20}$ alkyl group, a substituted or unsubstituted $C_1$–$C_{20}$ alkoxy group, a substituted or unsubstituted $C_2$–$C_{20}$ alkenyl group, a substituted or unsubstituted $C_6$–$C_{30}$ aryl group, a substituted or unsubstituted $C_6$–$C_{30}$ arylalkyl group, a substituted or unsubstituted $C_6$–$C_{30}$ aryloxy group, a substituted or unsubstituted $C_2$–$C_{30}$ heteroaryl group, a substituted or unsubstituted $C_2$–$C_{30}$ heteroarylalkyl group, a substituted or unsubstituted $C_2$–$C_{30}$ heteroaryloxy group, a substituted or unsubstituted $C_5$–$C_{20}$ cycloalkyl group, and a substituted or unsubstituted $C_2$–$C_{20}$ heterocycloalkyl group.

In accordance with another aspect of the present invention, there is provided a lithium battery comprising: a cathode; an anode; a separator interposed between the cathode and the anode; and the above-described organic electrolytic solution.

According to a specific embodiment, the lithium battery is a lithium sulfur battery comprising: a cathode; an anode; a separator interposed between the cathode and the anode; and an organic electrolytic solution containing a lithium salt, the alkoxy-containing compound of formula (1) above, and at least one of polyglyme and an organic compound having dioxolane moiety.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
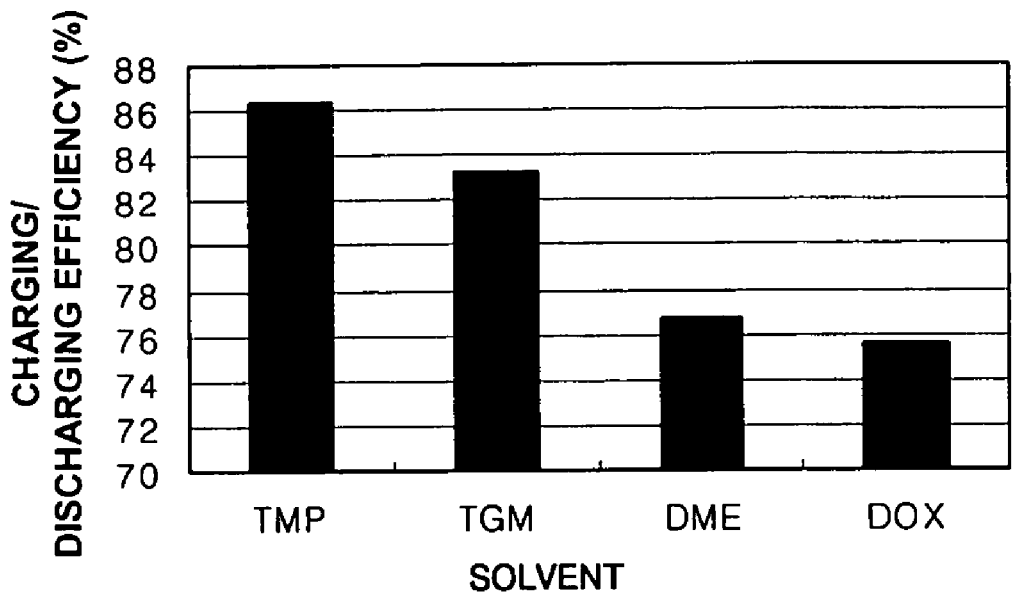
FIG. 1 is a graph showing charging/discharging efficiency for lithium batteries manufactured using trimethoxypropane (TMP), triglyme (TGM), dimethoxyethane (DME), or 1,3-dioxolane (1,3-DOX) as an organic solvent of an organic electrolytic solution.

Hereinafter, embodiments of an organic electrolytic solution and a lithium battery containing the organic electrolytic solution according to the present invention will be described.

As a lithium battery is charged, dendrites are formed on the surface of a lithium metal electrode. The formed dendrites lead to shorting out and a reduced lifespan of the battery.

After the lithium battery is charged, a solid electrolyte interface (SEI) is formed on the surface of the anode as a result of decomposition of the electrolytic solution, which effectively suppresses the growth of dendrites and side reactions occurring at the surface of the anode, thereby improving the lifespan of the battery. However, with repeated charging/discharging cycles of the battery, even the SEI degrades and the electrolytic solution decomposes more and more at the surface of the anode. Accordingly, in the present invention, the composition of the electrolytic solution is optimized not to decompose at the surface of the lithium metal and improve the charging/discharging efficiency of lithium.

The present invention provides an organic electrolytic solution composed of a lithium salt and an organic solvent, wherein the organic solvent composing the organic electrolytic solution according to the present invention comprises an alkoxy-containing compound of formula (1) below and at least one of polyglyme of formula (2) below and an organic compound having dioxolane moiety:

$$CH_3O(CH_2)_nCHR^1R^2 \qquad (1)$$

$$R^3(OCH_2CH_2)_mOR^4 \qquad (2)$$

In formulae (1) and (2) above, m is an integer from 1 to 10; n is an integer from 1 to 5; and $R^1$ and $R^2$ are independently selected from the group consisting of halogen atoms, a hydroxy group, a substituted or unsubstituted $C_1$–$C_{20}$ alkyl group, a substituted or unsubstituted $C_1$–$C_{20}$ alkoxy group, a substituted or unsubstituted $C_2$–$C_{20}$ alkenyl group, a substituted or unsubstituted $C_6$–$C_{30}$ aryl group, a substituted or unsubstituted $C_6$–$C_{30}$ arylalkyl group, a substituted or unsubstituted $C_6$–$C_{30}$ aryloxy group, a substituted or unsubstituted $C_2$–$C_{30}$ heteroaryl group, a substituted or unsubstituted $C_2$–$C_{30}$ heteroarylalkyl group, a substituted or unsubstituted $C_2$–$C_{30}$ heteroaryloxy group, a substituted or unsubstituted $C_5$–$C_{20}$ cycloalkyl group, and a substituted or unsubstituted $C_2$–$C_{20}$ heterocycloalkyl group.

Examples of an unsubstituted $C_1$–$C_{20}$ alkyl group in formula (1) above include a methyl group, an ethyl group, a propyl group, an isobutyl group, a sec-butyl group, a pentyl group, an iso-amyl group, a hexyl group, etc., wherein at least one hydrogen atom of the alkyl group may be substituted with a halogen atom, a hydroxy group, a nitro group, a cyano group, an amino group, an amidino group, hydrazine, hydrazone, a carboxy group, a sulfonic acid group, a $C_1$–$C_{20}$ alkyl group, a $C_1$–$C_{20}$ halogenated alkyl group, a $C_2$–$C_{20}$ alkenyl group, a $C_2$–$C_{20}$ alkynyl group, a $C_1$–$C_{20}$ heteroalkyl group, a $C_6$–$C_{30}$ aryl group, a $C_6$–$C_{30}$ arylalkyl group, a $C_6$–$C_{30}$ heteroaryl group, or a $C_6$–$C_{30}$ heteroarylalkyl group.

Examples of an unsubstituted $C_1$–$C_{20}$ alkoxy group in formula (1) above include a methoxy group, an ethoxy group, a propoxy group, an isobutyl group, a sec-butyloxy group, a pentyloxy group, an iso-amyloxy group, a hexyloxy group, etc, wherein at least one hydrogen atom of the alkoxy group can be substituted with any substitute group described above as being suitable for the $C_1$–$C_{20}$ alkyl group described above.

The aryl group in formula (1) above means a $C_6$–$C_{30}$ carbocyclic aromatic system containing at least one ring wherein such rings may be attached together in a pendent manner or may be fused. Examples of such an aryl group include phenyl, naphthyl, tetrahydronaphthyl, etc., wherein at least one hydrogen atom of the aryl group can be substituted with any substitute group described above as being suitable for the $C_1$–$C_{20}$ alkyl group.

The arylalkyl group in formula (1) above according to the present invention means the above-defined aryl group having lower alkyl substituted groups, for example, methyl, ethyl, propyl, etc. for some hydrogen atoms. Examples of an arylalkyl group include benzyl, phenylethyl, etc. At least one hydrogen atom of the arylalkyl group can be substituted with any substitute group described above as being suitable for the $C_1$–$C_{20}$ alkyl group.

Examples of an aryloxy group in formula (1) above include a phenyloxy group, a naphthyloxy group, a tetrahydronaphthyloxy group, etc.

The heteroaryl group in formula (1) above means a $C_5$–$C_{30}$ carbocyclic system containing one, two, or three hetero atoms selected from the group consisting of N, O, P, and S, wherein at least one hydrogen atom of the heteroaryl group can be substituted with any substitute group described above as being suitable for the $C_1$–$C_{20}$ alkyl group.

The heteroarylalkyl group in formula (1) above means the above-defined heteroaryl group having lower alkyl substituted groups for some hydrogen atoms, wherein at least one hydrogen atom of the heteroarylalkyl group can be substituted with any substitute group described above as being suitable for the $C_1$–$C_{20}$ alkyl group.

The cycloalkyl group in formula (1) above means a $C_4$–$C_{30}$ monovalent monocyclic system, wherein at least one hydrogen atom of the cycloalkyl group can be substituted with any substitute group described above as being suitable for the $C_1$–$C_{20}$ alkyl group.

The heterocycloalkyl group in formula (1) above means a $C_5$–$C_{30}$ monovalent carbocyclic system containing one, two, or three hetero atoms selected from the group consisting of N, O, P, and S, wherein at least one hydrogen atom of the heterocycloalkyl group can be substituted with any substitute group described above as being suitable for the $C_1$–$C_{20}$ alkyl group.

The alkoxy-containing compound of formula (1) above lowers reactivity with lithium metal and improves the conductivity of lithium ions. A lithium ion secondary battery or a lithium sulfur secondary battery manufactured using an organic electrolytic solution containing the alkoxy-containing compound shows improved charging/discharging efficiency of lithium compared with other kinds of lithium secondary batteries.

Examples of the alkoxy-containing compound of formula (1) above include trimethoxypropane (TMP) of formula (3) below, etc.

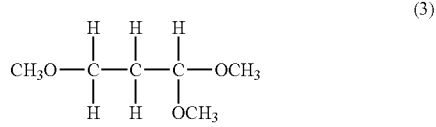

(3)

Examples of polyglyme of formula (2) above include diglyme (DGM, also called "diethyleneglycol dimethylether"), diethyleneglycol diethylether, triglyme (TGM, also called "triethyleneglycol dimethylether"), triethyleneglycol triethylether, etc.

Examples of an organic compound having dioxolane moiety include 1,3-dioxolane, 4,5-diethyl-dioxolane, 4,5-dimethyl-dioxolane, 4-methyl-1,3-dioxolane, and 4-ethyl-1,3-dioxolane.

It is preferable that polyglyme of formula (1) above and the organic compound having dioxolane moiety are mixed in a ratio of 1:9–9:1 by volume. If the amount of organic compound having dioxolane moiety exceeds the above range, discharging capacity and charging/discharging cycle life are markedly reduced.

An organic solvent composing an organic electrolytic solution according to the present invention includes the alkoxy-containing compound of formula (1) above, at least one of the polyglyme of formula (2) above and the organic compound having dioxolane moiety, and at least one solvent selected from the group consisting of methylene carbonate, ethylene carbonate, diethyl carbonate, dimethyl carbonate, γ-butyrolactone, propylene carbonate, methyl ethyl carbonate, vinylene carbonate, 2-fluorobenzene, 3-fluorobenzene, 4-fluorobenzene, dimethoxyethane, and diethoxyethane. It is preferable that the solvent added amounts to 5–95% by volume and the alkoxy-containing compound of formula (1) above amounts to 5–95% g by volume, based on the total volume of organic solvent. If the amount of alkoxy-containing compound of formula (1) above is less than 5% by volume, the effect of stabilizing lithium metal is negligible. If the amount of alkoxy-containing compound of formula (1) above exceeds 95% by volume, there are few additional effects.

In an organic electrolyte solution according to the present invention, any lithium salt commonly used in the field can be used. For example, at least one selected from the group consisting of lithium perchlorate ($LiClO_4$), lithium tetrafluoroborate ($LiBF_4$), lithium hexafluorophosphate ($LiPF_6$), lithium trifluoromethansulfonate ($LiCF_3SO_3$), and lithium bistrifluoromethansulfonylamide ($LiN(CF_3SO_2)_2$) can be used as the lithium salt. It is preferable that the concentration of lithium salt is in a range of 0.5–2.0M. If the concentration of lithium salt is less than 0.5M, ionic conductivity is low. If the concentration of lithium salt exceeds 2.0M, undesirably the lithium salt is more likely to decompose.

In an experimental example according to the present invention, the charging/discharging efficiency was measured using trimethoxypropane(TMP), triglyme(TGM), and 1,3-dioxolane (1,3-DOX), which compose the organic electrolytic solution according to the present invention, and using dimethylethane (DME) for comparison, according to the following method.

An electrode assembly was manufactured by binding a cathode and an anode, both of which were made of lithium metal, with a polyethylene separator interposed between the cathode and the anode. Different compositions of organic electrolytic solutions containing 1M $LiN(SO_2CF_3)_2$ as a lithium salt and TMP, TGM, 1,3-DOX, or DME as an organic solvent were prepared.

2016 type coin batteries were manufactured using the electrode assembly and the organic electrolytic solutions.

The results of measuring the charging/discharging efficiency are shown in FIG. 1. Referring to FIG. 1, the battery containing TMP shows the highest charging/discharging efficiency than the other batteries containing TGM, 1,3-DOX, or DME.

The organic electrolytic solution according to the present invention can be used in any kind of common lithium primary or secondary batteries.

Hereinafter, a method for manufacturing a lithium secondary battery according to an embodiment of the present invention will be described.

First, a cathode and an anode are manufactured using a common method applied to produce lithium batteries. A lithium metal composite oxide, such as $LiCoO_2$ and $LiMn_2O_3$, or a transition metal compound is used as a cathode active material. A lithium metal electrode or a carbonaceous or graphite electrode is used for the anode.

Next, a separator is interposed between the cathode and the anode and subjected to winding or the stacking of more electrodes and separators, to form an electrode assembly. The resulting electrode assembly is sealed in a battery case.

Next, the organic electrolytic solution according to the present invention is injected into the battery case containing the electrode assembly, so that a complete lithium secondary battery is obtained.

The organic electrolytic solution according to the present invention can be applied to lithium polymer secondary batteries containing polymer electrolytes as well as the lithium ion secondary battery described above.

The organic electrolytic solution according to the present invention can be applied to lithium sulfur batteries.

Hereinafter, a method for manufacturing a lithium sulfur battery according to an embodiment of the present invention will be described. A method for manufacturing a lithium sulfur battery is similar to the above-described method for manufacturing a lithium secondary battery, with the exception of the material for the cathode. In a certain case, a protective layer may be further interposed between the anode and the separator so as to suppress the reaction of lithium with the electrolytic solution.

At least one selected from the group consisting of sulfur, sulfone, catholyte containing $Li_2S_n$ where $n \geq 1$, organosulfur, and $(C_2S_x)_y$ where x ranges from 2.5 to 20 and $y \geq 2$, is used as the material for the cathode. It is preferable that the anode is formed as a lithium metal electrode, a lithium-metal alloy electrode made of, for example, lithium-aluminum, lithium-magnesium or lithium-silicon, or a lithium-inert sulfur composite electrode, or an elecrode formed of carbonaceous material or graphite material.

The present invention will be described in greater detail with reference to the following examples. The following examples are for illustrative purposes and are not intended to limit the scope of the invention.

To measure the charging/discharging efficiency of a lithium battery containing the organic electrolytic solution according to the present invention, 2016 type half coin batteries were manufactured in Examples 1 through 4 and Example 8, and full lithium sulfur batteries were manufactured in Examples 5 through 8.

EXAMPLE 1

An electrode assembly including a cathode, an anode, and a polyethylene separator (Ashai Co.) between the cathode and the anode was manufactured, wherein lithium metal electrodes were used for the cathode and the anode.

The electrode assembly was sealed in a battery case, and an organic electrolytic solution according to the present invention was injected to provide a complete lithium battery.

The organic electrolytic solution contained 1M (LiN$(CF_3SO_2)_2$) as a lithium salt, and a mixture of diglyme (DGM), 1,3-dioxolane (1,3-DOX), and trimethoxypropane (TMP) in a ratio of 45:45:10 by volume was used as an organic solvent.

EXAMPLE 2

A lithium battery was manufactured in the same manner as in Example 1, except that a mixture of DGM, 1,3-DOX, and TMP in a ratio of 35:35:30 by volume was used for the organic solvent of the electrolytic solution.

EXAMPLE 3

A lithium battery was manufactured in the same manner as in Example 1, except that a mixture of DGM, 1,3-DOX, and TMP in a ratio of 25:25:50 by volume was used for the organic solvent of the electrolytic solution.

EXAMPLE 4

A lithium battery was manufactured in the same manner as in Example 1, except that a mixture of DGM, 1,3-DOX, and TMP in a ratio of 15:15:70 by volume was used for the organic solvent of the electrolytic solution.

EXAMPLE 5

A cathode active material slurry was prepared by mixing 70 parts by weight of sulfur, 10 parts by weight of Ketjen black as a carbon source, and 20 parts by weight of polyethyleneoxide in acetonitrile.

A carbon-coated aluminum (Al) substrate was coated with the cathode active material composition and dried to form a cathode. A lithium metal electrode was used as an anode.

An electrode assembly including the cathode, a polyethylene separator, and the anode was manufactured and sealed in a battery case. An organic electrolytic solution was injected into the battery case to provide a complete lithium sulfur battery.

The organic electrolyte solution contained 1M LiN$(SO_2CF_3)_2$ as a lithium salt and a mixture of triglyme (TGM) and TMP in a ratio of 50:50 by volume as an organic solvent.

EXAMPLE 6

A lithium sulfur battery was manufactured in the same manner as in Example 5, except that a mixture of 1,3-DOX and TMP in a ratio of 50:50 by volume was used for the organic solvent of the electrolytic solution.

EXAMPLE 7

A lithium sulfur battery was manufactured in the same manner as in Example 5, except that a mixture of TGM, TMP, and 1,3-DOX in a ratio of 40:40:20 by volume was used for the organic solvent of the electrolytic solution.

EXAMPLE 8

A lithium sulfur battery was manufactured in the same manner as in Example 5, except that a mixture of DGM, TMP, and 1,3-DOX in a ratio of 40:40:20 by volume was used for the organic solvent of the electrolytic solution.

EXAMPLE 9

A lithium battery was manufactured in the same manner as in Example 1, except that a mixture of DGM, 1,3-DOX, and TMP in a ratio of 45:45:10 by volume was used for the organic solvent of the electrolytic solution.

Comparative Example 1

A lithium battery was manufactured in the same manner as in Example 1, except that a mixture of DGM and 1,3-DOX in a ratio of 50:50 by volume was used for the organic solvent of the electrolytic solution.

Comparative Example 2

A lithium battery was manufactured in the same manner as in Example 1, except that only TMP was used for the organic solvent of the electrolytic solution.

Comparative Example 3

A lithium sulfur battery was manufactured in the same manner as in Example 5, except that $LiSO_2CF_3$ was used for the lithium salt and a mixture of 1,3-DOX, DGM, dimethylethane (DME), and sulfolane (SUL) in a ratio of 50:20:20:10 by volume was used as for the organic solvent of the electrolytic solution.

Comparative Example 4

A lithium sulfur battery was manufactured in the same manner as in Example 5, except that a mixture of DGM, DME, and 1,3-DOX in a ratio of 40:40:20 by volume was used for the organic solvent of the electrolytic solution.

Comparative Example 5

A lithium sulfur battery was manufactured in the same manner as in Example 5, except that a mixture of DGM, DMM, and 1,3-DOX in a ratio of 40:40:20 by volume was used for the organic solvent of the electrolytic solution.

The charging/discharging efficiency with respect to TMP content was measured using the lithium ion secondary batteries manufactured in Examples 1 through 4, Example 9, and Comparative Examples 1 and 2. The results are shown in FIG. 2.

Figure 2:
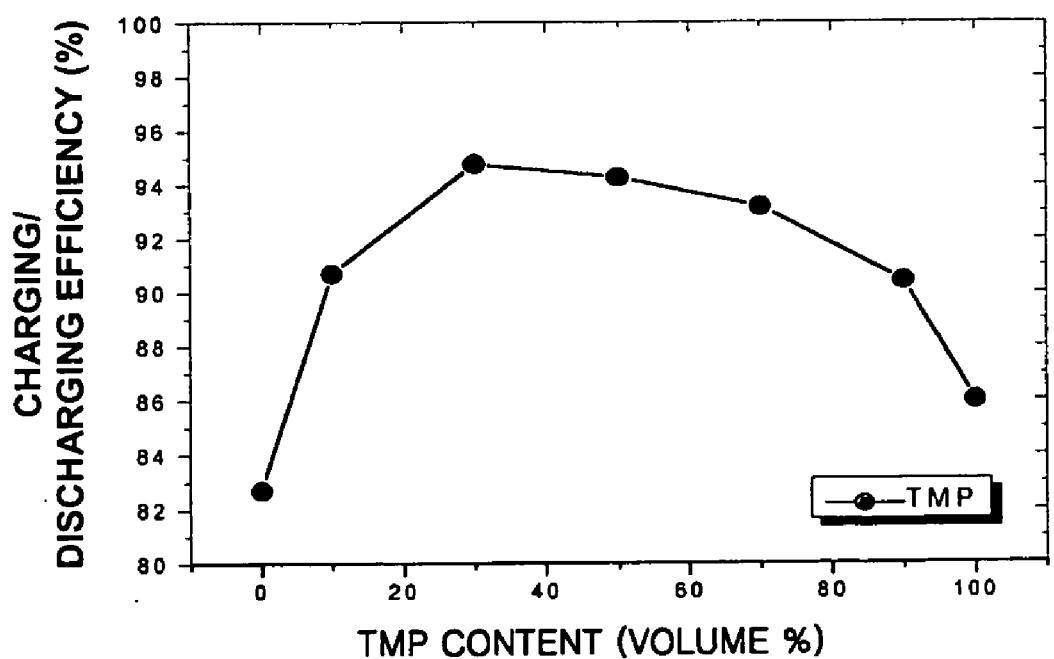
FIG. 2 is a graph showing charging/discharging efficiency for lithium batteries manufactured in Examples 1 through 4 and Example 9 according to the present invention and Comparative Examples 1 and 2.

As is apparent from FIG. 2, the charging/discharging efficiency of lithium was greatest at about 30% by volume of TMP.

Figure 3:
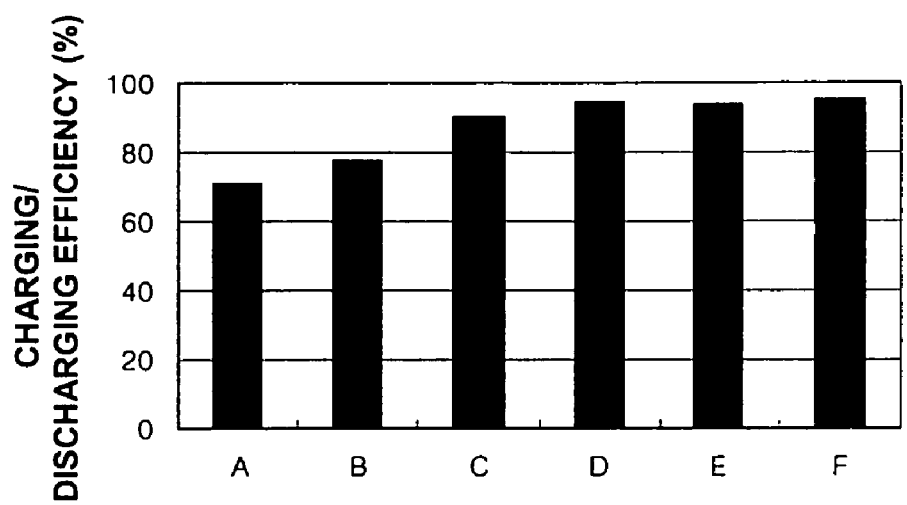
FIG. 3 is a graph showing charging/discharging efficiency for lithium sulfur batteries manufactured in Examples 5 through 8 and Comparative Examples 3 anad 4.

The charging/discharging cycle property, i.e., charging/discharging efficiency was measured using the lithium sulfur batteries manufactured in Examples 5 through 8 and Comparative Examples 3 and 4. The results are shown in FIG. 3. In FIG. 3, "A" denotes the case using the electrolytic solution composed of 1M $LiSO_2CF_3$ and the mixture of DOX, DGM, DME, and SUL in a ratio of 5:2:2:1 by volume (Comparative Example 3), "B" denotes the case using 1M $LiN(SO_2CF_3)_2$ and the mixture of DGM, DME, and DOX in a ratio of 4:2:2 by volume (Comparative Example 4), "C" denotes the case using 1M $LiN(SO_2CF_3)_2$ and the mixture of TGM and TMP in a ratio of 1:1 by volume (Example 5), "D" denotes the case using 1M $LiN(SO_2CF_3)_2$ and the mixture of DOX and TMP in a ratio of 1:1 by volume (Example 6), "E" denotes the case using 1M $LiN(SO_2CF_3)_2$ and the mixture of TGM, TMP, and DOX in a ratio of 4:4:2 by volume (Example 7), "F" denotes the case using 1M $LiN(SO_2CF_3)_2$ and the mixture of DGM, TMP, DOX in a ratio of 4:4:2 by volume (Example 8).

Referring to FIG. 3, Examples 5 through 8 show greater lithium charging/discharging efficiency than Comparative Examples 3 and 4. The lithium charging/discharging efficiency is greatest for Example 8 where the mixture of DGM, TMP, and DOX in a ratio of 4:4:2 by volume was used as the organic solvent.

Figure 4:
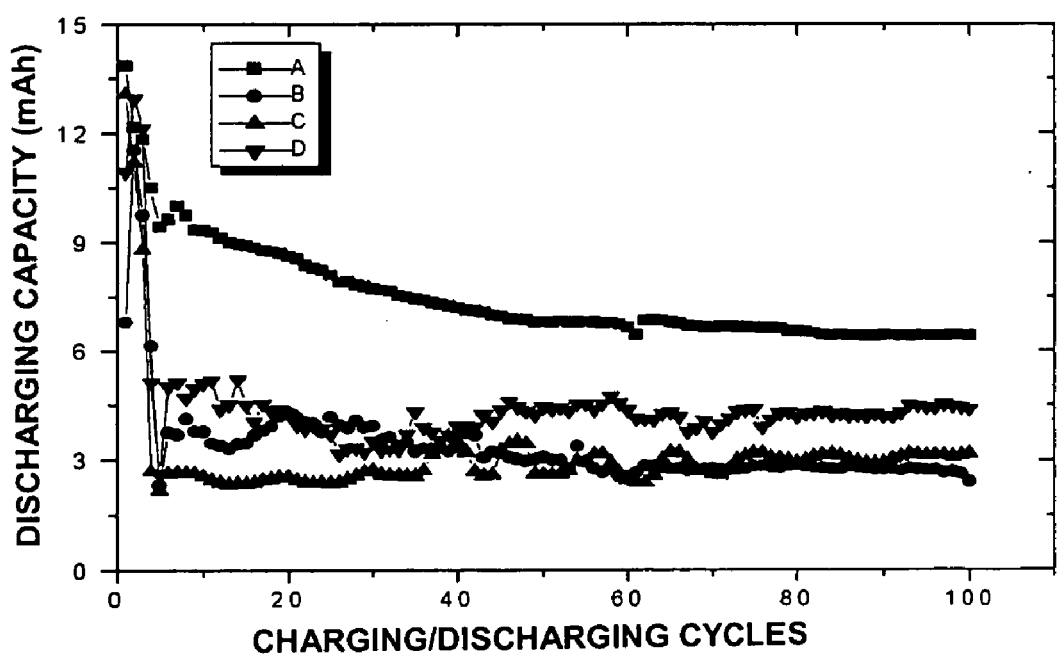
FIG. 4 is a graph showing change in discharging capacity with respect to the number of charging/discharging cycles for lithium sulfur batteries manufactured in Example 8 and Comparative Examples 3 through 5.

FIG. 4 is a graph showing change in discharging capacity versus the number of charging/discharging cycles for the lithium secondary batteries manufactured in Examples 7 and 8 and Comparative Examples 3 and 4. In FIG. 4, "A" denotes the case using 1M $LiN(SO_2CF_3)_2$ and the mixture of TGM, TMP, and DOX in a ratio of 4:4:2 by volume (Example 7), "B" denotes the case using 1M $LiN(SO_2CF_3)_2$ and the mixture of DGM, DMM, and DOX in a ratio of 4:4:2 (Comparative Example 5), "C" denotes the case using 1M $LiN(SO_2CF_3)_2$ and the mixture of DOX, DGM, DME, and SUL in a ratio of 5:2:2:1 (Comparative Example 3), and "D" denotes the case using 1M $LiN(SO_2CF_3)_2$ and the mixture of DGM, DME, and DOX in a ratio of 4:4:2 (Comparative Example 4).

As is apparent from FIG. 4, Example 8, where the 4:4:2 mixture of DGM, TMP, and DOX in a ratio of 4:4:2 by volume was as the organic solvent, shows the greatest charging/discharging efficiency among the cases of Example 8 and Comparative Examples 3 and 4.

An organic electrolytic solution according to the present invention contains an alkoxy-containing compound such as trimethoxypropane (TMP). When polyglyme and an organic compound having dioxolane moiety are further added into the organic electrolytic solution, a lithium metal stabilizing effect and the ionic conductivity of lithium ions are enhanced, and thus, the charging/discharging efficiency of lithium is greatly improved. Such an organic electrolytic solution according to the present invention can be effectively used for any kind of lithium batteries and lithium sulfur batteries, even those which use a lithium metal anode.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An organic electrolytic solution for a lithium battery or a lithium sulfur battery comprising a lithium salt and an organic solvent containing trimethoxypropane, polyglyme, and an organic compound having dioxolane moiety,
   wherein the polyglyme and the organic compound having dioxolane moiety are mixed in a ratio of 1:9–9:1 by volume.

2. The organic electrolytic solution of claim 1, wherein the polyglyme is selected from the group consisting of diethyleneglycol dimethylether ($CH_2(OCH_2CH_2)_2OCH_3$), diethyleneglycol diethylether ($C_2H_5(OCH_2CH_2)_2OC_2H_5$), triethyleneglycol dimethylether ($CH_3(OCH_2CH_2)_{30}OCH_3$), and triethyleneglycol diethylether ($C_2H_5(OCH_2CH_2)_3OC_2H_5$).

3. The organic electrolytic solution of claim 1, wherein the organic compound having dioxolane moiety is selected from the group consisting of 1,3-dioxolane, 4,5-diethyl-dioxolane, 4,5-dimethyl-dioxolane, 4-methyl-1,3dioxolane, and 4-ethyl-1,3-dioxolane.

4. The organic electrolytic solution of claim 1, wherein the amount of polyglyme and the organic compound having dioxolane moiety is in the range of 5–95% by volume, and the amount of trimethoxypropane is in the range of 5–95% by volume, based on the total volume of organic solvent.

5. The organic electrolytic solution of claim 1, further comprising at least one solvent selected from the group consisting of methylene carbonate, ethylene carbonate, diethyl carbonate, dimethyl carbonate, γ-butyrolactone, propylene carbonate, methyl ethyl carbonate, vinylene carbonate, 2-fluorobenzene, 3-fluorobenzene, 4-fluorobenzene, dimethoxyethane, and diethoxyethane.

6. The organic electrolytic solution of claim 5, wherein the amount of solvent further added is in the range of 5–95% by volume, and the amount of trimethoxypropane is in the range of 5–95% by volume, based on the total volume of organic solvent.

7. The organic electrolytic solution of claim 1, wherein the lithium salt has a concentration of 0.5–2.0M.

8. A lithium battery comprising:
   a cathode;
   an anode'
   a separator interposed between the cathode and the anode; and
   the organic electrolytic solution of claim 1.

9. The lithium battery of claim 8, wherein the cathode contains at least one selected from the group consisting of lithium composite oxide, sulfur, catholyte containing $Li_2S_n$, wherein $n \geq 1$ organo-sulfur, and $(C_2S_x)_y$, wherein x ranges from 2.5 to 20 and $y \geq 2$.

10. The lithium battery of claim 8, wherein the anode is selected from the group consisting of lithium metal electrode, a lithium-metal alloy electrode, a lithium-inert sulfur composite electrode, an electrode formed of a carbonaceous material or a graphite material.

* * * * *